E. Easton.
Farm Gate.

Nº 81,077.          Patented Aug. 18, 1868.

Witnesses
Chas. H. Hadaway
Wm. T. Hutchinson

Inventor,
Elias Easton
by Prindle and Co. Atty.

United States Patent Office.

ELIAS EASTON, OF PRAIRIEVILLE, MICHIGAN.

Letters Patent No. 81,077, dated August 18, 1868.

IMPROVEMENT IN FARM-GATES.

*The Schedule referred to in these Letters Patent and making part of the same.*

TO ALL WHOM IT MAY CONCERN:

Be it known that I, ELIAS EASTON, of Prairieville, in the county of Barry, and in the State of Michigan, have invented an Improved Farm-Gate; and do hereby declare that the following is a full, clear, and exact description thereof, reference being had to the accompanying drawings, and the letters of reference marked thereon.

Figure 1:
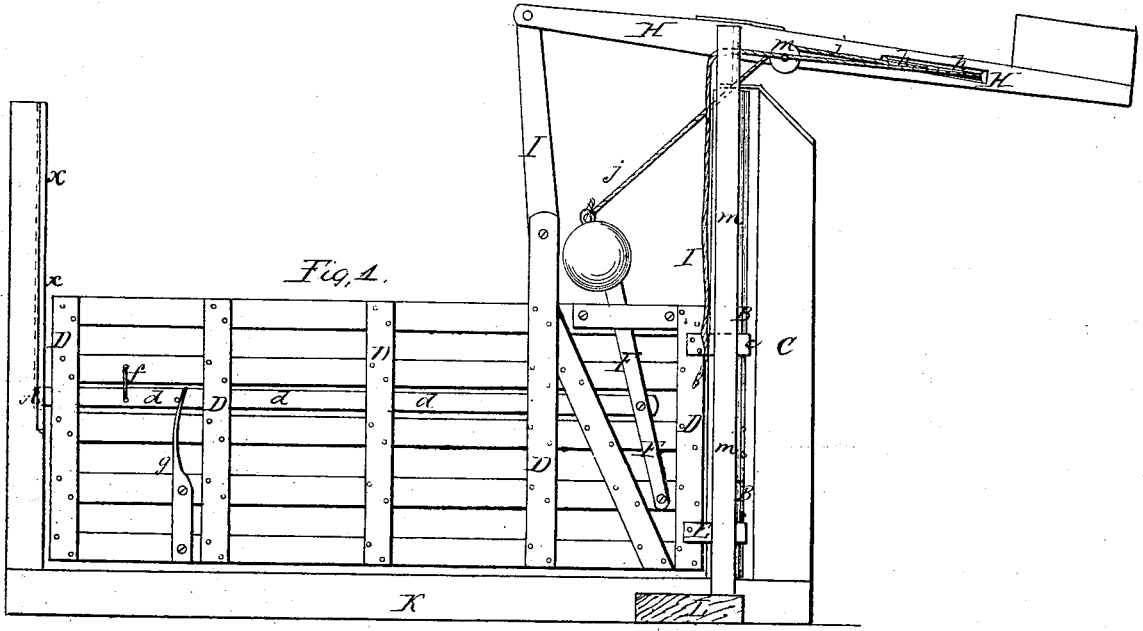
Figure 1 represents a side view of my improved gate.
Figure 2:
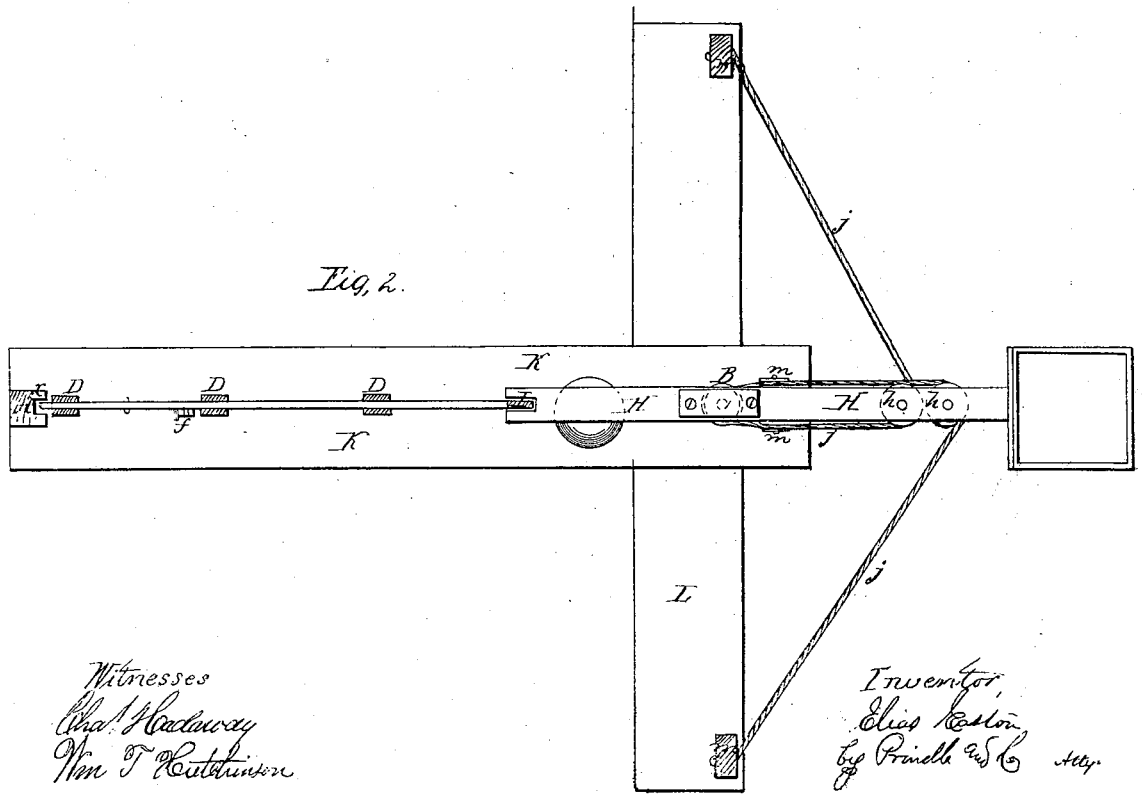
Figure 2 represents a top view of the same, with the opening and closing-attachment adjusted.

The nature of my invention relates to the construction, arrangement, and operation of a farm-gate, so that it may readily be opened or closed without the necessity of dismounting from a horse or carriage, and that the same may be easily adjusted on the gate-posts at any desired elevation.

In the annexed drawings, making a part of this specification, A and B represent the front and rear gate-posts, respectively, set at a suitable distance apart. The rear post, B, is made round or cylindrical, so that the clasp or loop-hinges $c$ $c$ may work thereon, and thereby suspend the gate, and is supported or braced by means of another post, C, connected to it at the top by means of a suitable strap of metal or strip of wood nailed or secured to the top of each.

The post A is provided with a groove, $x$, in its inside, which forms a catch for the latch $d$ of the gate at all times, whether the gate be elevated or depressed.

The post B is provided with a series of holes or perforations along one of its vertical sides, into which a pin or pins, of suitable dimensions, may be inserted to hold the gate at any elevation desired. The object of adjusting or securing the gate at different elevations is that small animals, like hogs or sheep, may be allowed to pass freely, while larger animals are prevented from the same, or the small animals may be prevented from passing, as may be desired.

The gate is constructed in any of the usual and known ways, and is composed of a series of parallel horizontal slats, securely bolted to and held by the vertical or cross-rails D D.

The latch $d$ is suspended between two of the slats of the gate, so that its outer extremity catches or locks in the groove $x$ by means of a link, $f$, at one end thereof, and the lever F at the other. The latch $d$ is held in place or lock by means of a small spring, $g$.

F represents a lever, pivoted at its lower end to one of the horizontal slats of the gate, and working in a suitable slot or guide at or near its upper end.

H represents a lever or beam, pivoted to the top of the post B, and provided with a slot, in which are adjusted the pulleys $h$ $h$.

One end of the lever H is pivoted to the pitman or connecting-rod I, and the other end supports a sufficient weight to balance the gate.

The lower end of the pitman I is pivoted to the gate, at a suitable distance from the rear post B.

I frame or adjust a suitable bed-piece, K, across the passage, and between the posts A and B, and secure at right angles therewith, and extending each way in a line with the post B, another bed-piece, L, to or near the extremities of which I frame or plant posts, M M.

In the top of each of the posts M M is adjusted a small pulley for the cords $j$ $j$ to work over.

I also adjust pulleys $m$ $m$, one on each side of the balance-lever H, as guides for the cords $j$ $j$, to keep them in line with the plane of the pulleys $h$ $h$.

The hinges $c$ $c$ are made of strap-metal, of sufficient strength to support the gate, and of dimensions so as to fit and work closely but freely over and around the cylindrical post B.

The operation of the above-described gate is simple, and will readily be seen.

Two cords, $j$ $j$, are secured to the top of the lever F, and passed thence over the pulleys $m$ $m$, and around the pulleys $h$ $h$, and over the pulleys in the top of the side or small posts M M, where they may be easily caught hold of by the operator.

The operator may ride up to either side of the gate, and take hold of one of the cords $jj$, and, by pulling on the same, the top of the lever F is drawn back, and the latch $d$ therewith, and at the same time the gate is drawn open in the forward direction of the rider.

It is found in practice that a small weight should be hung or attached to the extremities of the cords $jj$.

Having thus fully described my invention, what I claim as new, and desire to secure by Letters Patent, is—

1. The combination of the rear gate-post B, when provided with perforations, as described, with the clasp-hinges $c\ c$, and an ordinary gate, for the purpose of adjusting said gate at any desired elevation, as herein fully set forth.

2. The combination of the levers F and H with the cords $jj$ and side posts M and pitman I, when arranged substantially in the manner and for the purposes specified.

In testimony that I claim the foregoing, I have hereunto set my hand and seal, this    day of May, 1868.

ELIAS EASTON. [L. S.]

Witnesses:
 WM. L. BROWN,
 H. C. STORMS.